United States Patent [19]

Gilbert

[11] Patent Number: 5,205,182
[45] Date of Patent: Apr. 27, 1993

[54] CABLE ACTUATED MIRROR TILT CONTROL

[75] Inventor: Robert W. Gilbert, Lonsdale, Australia

[73] Assignee: Britax Rainsfords Pty Ltd, South Australia, Australia

[21] Appl. No.: 827,015

[22] Filed: Jan. 28, 1992

[30] Foreign Application Priority Data

Feb. 4, 1991 [AU] Australia .................... PK4442

[51] Int. Cl.$^5$ .......................................... F16C 1/10
[52] U.S. Cl. ............................ 74/502.1; 74/501.5 R; 359/841; 359/875
[58] Field of Search ............. 74/502.1, 502.2, 500.5, 74/501.5 R, 502.6; 359/872, 875, 841

[56] References Cited

U.S. PATENT DOCUMENTS

| | | | |
|---|---|---|---|
| 3,474,686 | 10/1969 | Liedel | 74/501 M |
| 3,618,420 | 11/1971 | Horwitt et al. | 74/501 M |
| 3,719,105 | 3/1973 | Horwitt et al. | 74/501 M |
| 4,080,049 | 3/1978 | Oskam et al. | 74/502.1 X |
| 4,197,762 | 4/1980 | Yamana | 74/502.1 |
| 4,250,767 | 2/1981 | Bottrill | 74/502.1 |
| 4,776,231 | 10/1988 | Cummins et al. | 74/502.1 |
| 4,789,232 | 12/1988 | Urbanek | 359/872 X |
| 4,809,561 | 3/1989 | Tsuyama | 74/502.1 |
| 4,867,409 | 9/1989 | Fimeri | 248/549 |
| 4,876,911 | 10/1989 | Kurihara | 74/502.1 |

FOREIGN PATENT DOCUMENTS

| | | | |
|---|---|---|---|
| 0191494 | 8/1986 | European Pat. Off. | |
| 193862 | 9/1986 | European Pat. Off. | 359/872 |
| 223923 | 6/1987 | European Pat. Off. | 359/872 |
| 460893 | 12/1991 | European Pat. Off. | |
| 2715335 | 10/1978 | Fed. Rep. of Germany | 74/502.1 |
| 3429713 | 2/1986 | Fed. Rep. of Germany | 359/872 |
| 2074884 | 10/1971 | France . | |
| 62-134346 | 6/1987 | Japan | 359/875 |

Primary Examiner—Rodney H. Bonck
Assistant Examiner—Andrea Pitts
Attorney, Agent, or Firm—Harness, Dickey & Pierce

[57] ABSTRACT

Tilt control device for an exterior "break-away" mirror assembly (10) of a motor vehicle comprises at least two lines (18) extending from the mirror back (13) of the mirror assembly over rigid curved guide line surfaces (20, 21, 22, 25, 26, 27) which guide the lines between the mirror back (13) and the control lever (24, 64), the lines being secured at the control lever ends in a manner to provide maximum line movement in response to control lever movement within an available space at the inner end of the control lever.

10 Claims, 4 Drawing Sheets

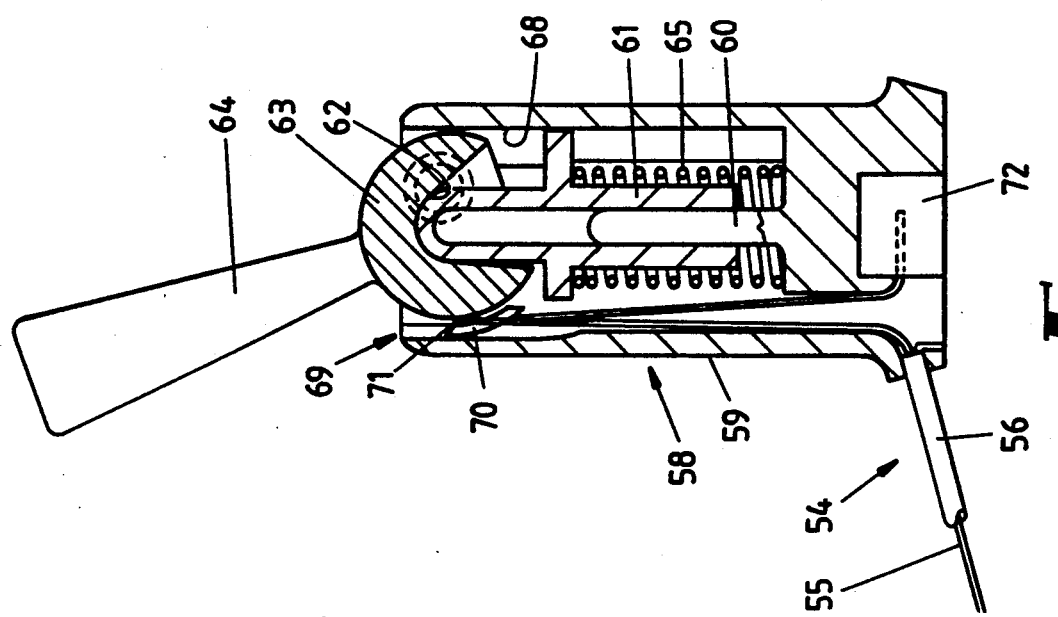
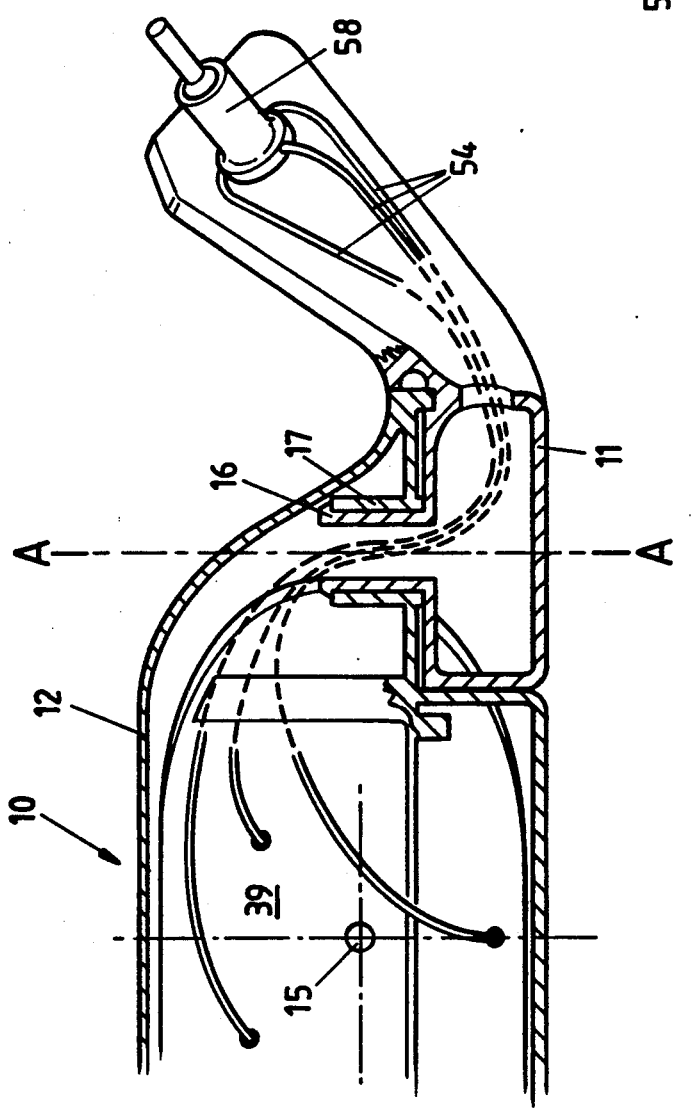

CABLE ACTUATED MIRROR TILT CONTROL

The invention relates to a cable actuated mirror tilt control for controlling the tilt of a mirror exterior of a motor vehicle.

It is already well known to use a cable control for controlling an exterior mirror of a motor vehicle from within the cabin, varying the inclination at least about a horizontal axis and usually about the horizontal and vertical axes.

Thus usual arrangement constitutes a "three Bowden cable" connection between a control lever within the cabin and the tilting mirror exterior of the vehicle, wherein the universal mirror tilt is effected by applying compressive forces selectively to the outer sheaths of Bowden cables, and this invention lies in the same general field, although in many instances Bowden cables are not preferred.

It is necessary for an exterior mirror of a motor vehicle to have a "break-away" facility which enables the mirror to be deflected when it strikes an obstruction such as a post for example, and to return to its normal position. One example of a "break-away" facility is included in our copending patent application PK 0432 on which is based the European application EP0460893 (91304998.7) and the U.S. patent application No. 07/707169 where use is made of interengaging hollow spigots, and reference can also be made to our Australian patent 617450, corresponding U.S. Pat. No. 4,867,409, and European application 88 304 023.0 wherein there are two hinge axes for "break-away" respectively in a rearward or forward direction.

PRIOR ART

In addition to the abovementioned prior art, reference can also be made to the U.S. Pat. No. 3,719,105 in the name of HORWITT et al, wherein a control lever has a ball shaped protuberance near its inner end, and the inner end is coupled to three cables. Swivelling of the lever causes movement of lines coupled to a mirror back to cause orientation of the mirror, the lines being in that invention the cores of three Bowden cables.

With all the relevant prior art known to the applicant however, there are still difficulties which are encountered, one of the main difficulties being that there is quite often a very limited space between inner and outer panels of a motor vehicle to accommodate the inner end of a control lever. Thus the movement of the control lever can occupy only a small distance (as illustrated in U.S. Pat. No. 3,719,105) and therefore the lines need to be anchored close to the tilt axis of the mirror back, and consequently tension within the lines can be quite high necessitating robust lines, as for example the cores of Bowden cables. One object of this invention therefore is to provide an arrangement whereby the line ends at the control lever can be moved through more of the available space which accommodates the inner end of the control lever. This arrangement enables the anchor points on the mirror back to be more widely spaced from the tilt axis and thereby reduce the tension in the lines necessary to overcome the friction at the central pivot, and thereby reduce likelihood of a jerk. It also provides widely spaced damping points on the mirror back, thereby reducing vibration of the mirror glass otherwise occurring due to flexing about the central pivot.

Another contributing factor to tension in lines is the friction between the core of a Bowden cable and its sheath, and another object of the invention is to provide a structure wherein it is feasible to use unsheathed lines in most instances.

However, even with the above advantages, sometimes there is not sufficient movement to meet all the requirements, and in a further aspect of the invention there is provided a means whereby there is multiplication of lever movement, which may be achieved either by having a line guide surface on the lever inner end or on a lever protuberance, with the lever ends of the lines anchored to a fixed structure on the mirror assembly or vehicle.

These improvements make it feasible to use very much lighter lines than have been used previously in many applications, but the lighter lines in turn are liable to stretch under some conditions which may not be foreseen, and further may be provided means for tensioning the lines.

BRIEF SUMMARY OF THE INVENTION

In this invention, tilt control means for an exterior "break-away" mirror assembly of a motor vehicle comprises at least two lines extending from the mirror back of the mirror assembly over rigid curved guide line surfaces which guide the lines between the mirror back and the control lever, the lines being secured at the control lever ends in a manner to provide maximum line movement in response to control lever movement within an available space at the inner end of the control lever. The lines can for example be secured to the inner end of the control lever, or can pass over rigid line guide surfaces in the control lever, and can also pass over rigid curved guide line surfaces in the "break-away" mirror assembly so as to extend through a zone or zones adjacent to "break-away" mirror axis or axes. The rigid guide line surfaces can be surfaces of fixed pins for example or can be surfaces of pulleys. The lines need not necessarily be robust as in Bowden cables (although some embodiments of the invention use Bowden cables) but in many instances can be polymeric material for example long chain polyethylene. They could also be monofilament nylon, plastic coated thin wire cable, or single wires. Suitable lines can also be produced from natural fibers such as wool or cotton.

More specifically, in one aspect of the invention, tilt control means for an exterior "break-away" mirror assembly of a motor vehicle is provided with a mounting frame of shape to be secured to an exterior portion of the motor vehicle body, a mirror casing, a mirror back carrying a mirror and coupled to the casing by a tilt joint for tilting about at least an horizontal axis, and hinge means so operatively coupling the mirror casing to the mounting frame as to provide means for the mirror casing "break-away" about at least one generally vertical axis, comprising control lever retention means and a control lever projecting therefrom and pivotable about at least one axis, at least two retention anchors on the mirror back spaced radially from said tilt joint, a corresponding number of flexible lines each connected at one end to a respective said retention anchor and at the other end to the control lever, and rigid curved line guide surfaces which guide said lines between the mounting frame and the mirror back to extend through a zone adjacent said "break-away" axis.

In another aspect of the invention, tilt control means for an exterior "break-away" mirror assembly of a motor vehicle is provided with a mounting frame of shape to be secured to an exterior portion of the motor vehicle body, a mirror casing, a mirror back carrying a mirror and coupled to the casing by a tilt joint for tilting about at least an horizontal axis, and hinge means so operatively coupling the mirror casing to the mounting frame as to provide means for the mirror casing "break-away" about at least one generally vertical axis, comprising control lever retention means and a control lever projecting therefrom and pivotable about at least one axis, at least two curved line guide surfaces on the control lever which are spaced radially from said control lever pivotable axis, at least two retention anchors on the mirror back which are spaced radially from said tilt joint, and a corresponding number of flexible lines each connected at one end to a respective said retention anchor, passing over a respective said curved line guide surface and fast at the other end with the control lever retention means.

BRIEF DESCRIPTION OF THE DRAWINGS

Embodiments of the invention are described hereunder in some detail with reference to and as illustrated in the accompanying drawings in Which:

FIG. 5 is a view similar to FIG. 2 but showing a sleeve containing a control lever with a part-spherical protuberance; and FIG. 6 is a central section which illustrates the control lever to a large scale, contained in a sleeve and having rigid curved guideline surfaces on the control lever, the lines being anchored to an anchor block contained in the base of the sleeve.

DESCRIPTION OF THE PREFERRED EMBODIMENTS

Figure 1:
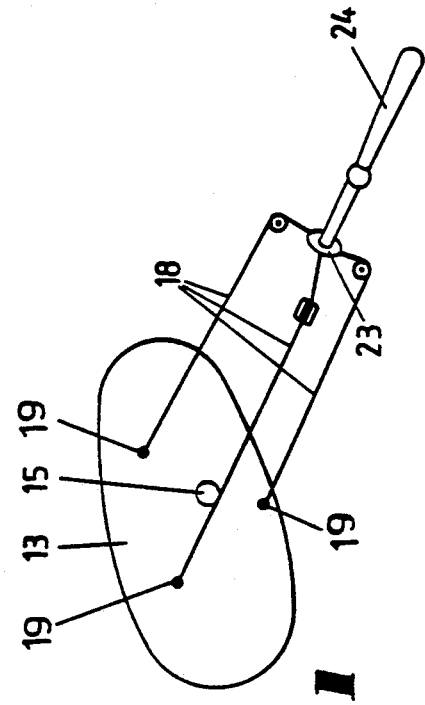
FIG. 1 is a diagrammatic representation of an arrangement wherein the lines extending from the mirror back to the control lever are secured to the inner end of the control lever, passing over rigid curved line guide surfaces.
Figure 2:
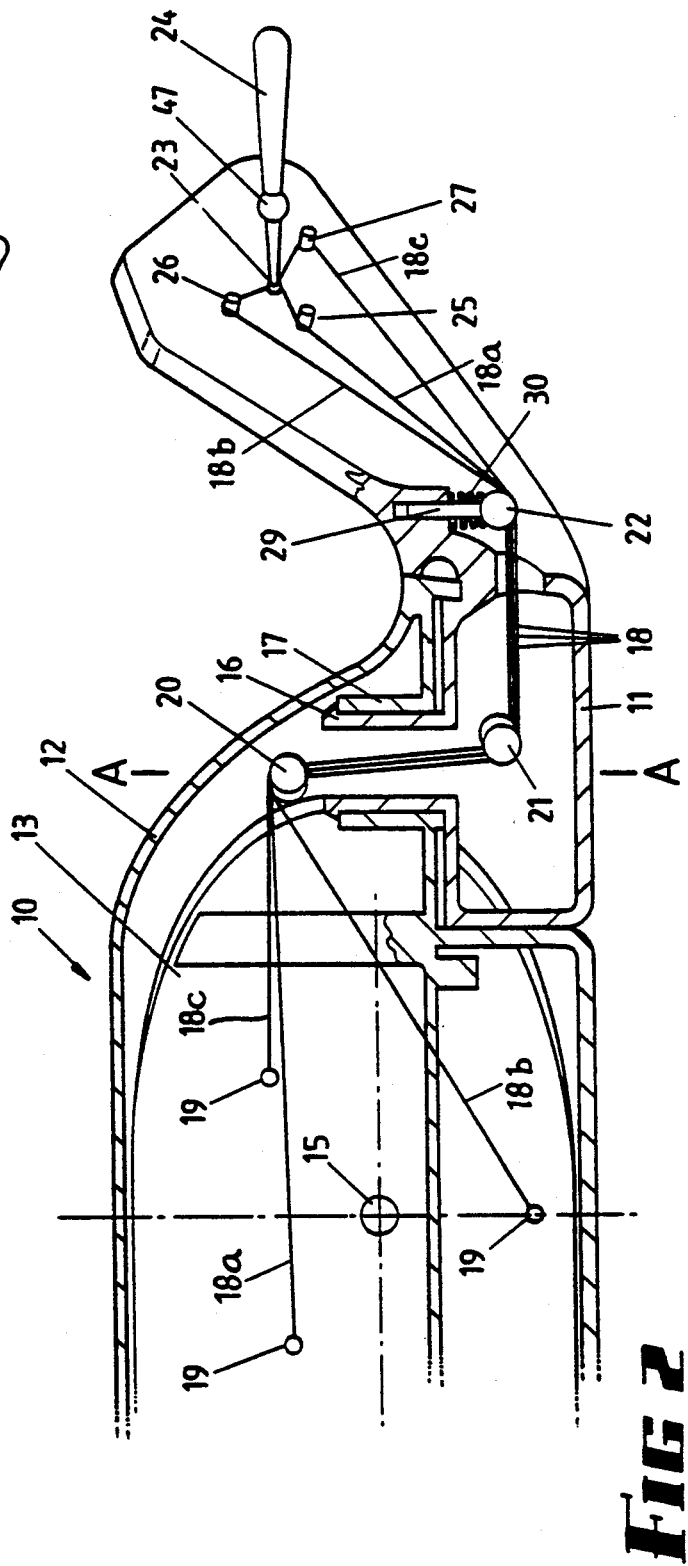
FIG. 2 is a fragmentary illustrative section showing the arrangement of FIG. 1 when applied to a spigot type "break-away" mirror.

Two embodiments are described hereunder with reference to the drawings, the first embodiment being illustrated in FIGS. 1 through to 4b. In that embodiment, there is provided tilt control means for an exterior "break-away" mirror assembly 10 of a motor vehicle which has a mounting frame 11 of shape to be secured to an exterior portion of the vehicle body, a mirror casing 12, a mirror back 13 within the casing 12, which carries a mirror 14, and the mirror back 13 being coupled to the casing 12 by means of a ball type tilt joint 15 for tilting the mirror and mirror back with respect to the casing about two axes. In FIG. 2, there is illustrated an arrangement comprising an inner hollow spigot 16 which is upstanding from the mounting frame 11, and is surrounded by an outer hollow spigot 17 which forms portion of the casing 12, the outer spigot being rotatable about the inner spigot to provide the required axis A—A for "break-away" of the casing with respect to the mounting frame in either forward or rearward direction. This arrangement is described in detail in our abovementioned patent applications EP0460893 (91304998.7) and U.S. Pat. No. 07/707169. In this arrangement, three flexible unsheathed lines 18a, 18b, and 18c (of long chain polyethylene) extend from retention anchors 19 on a mirror back spaced radially from the tilt joint 15, over rigid curved guideline surfaces 20, 21 and 22, to an operating locality where they are connected to the inner end 23 of a control lever 24, but pass over further rigid curved guideline surfaces 25, 26 and 27 which are spaced radially outwardly from the inner end 23 of lever 24.

There needs to be a spring tensioner for the lines 18, and this is effected in the embodiment of FIG. 2 by the guide 22 being on the end of a plunger 29 which is movable in the mounting frame 11, and is spring loaded outwardly by a small compression spring 30. As illustrated the guide surfaces are all stationary surfaces of circular section pins, but obviously some or all can involve rotatable pulleys or sleeves.

Figure 3B:
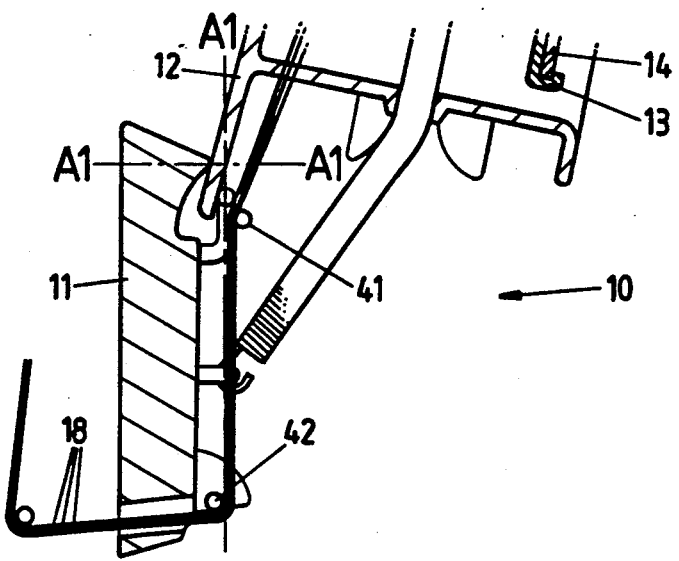
FIG. 3b shows how the lines are deflected by rigid curved guideline surfaces upon forward "break-away"
Figure 3A:
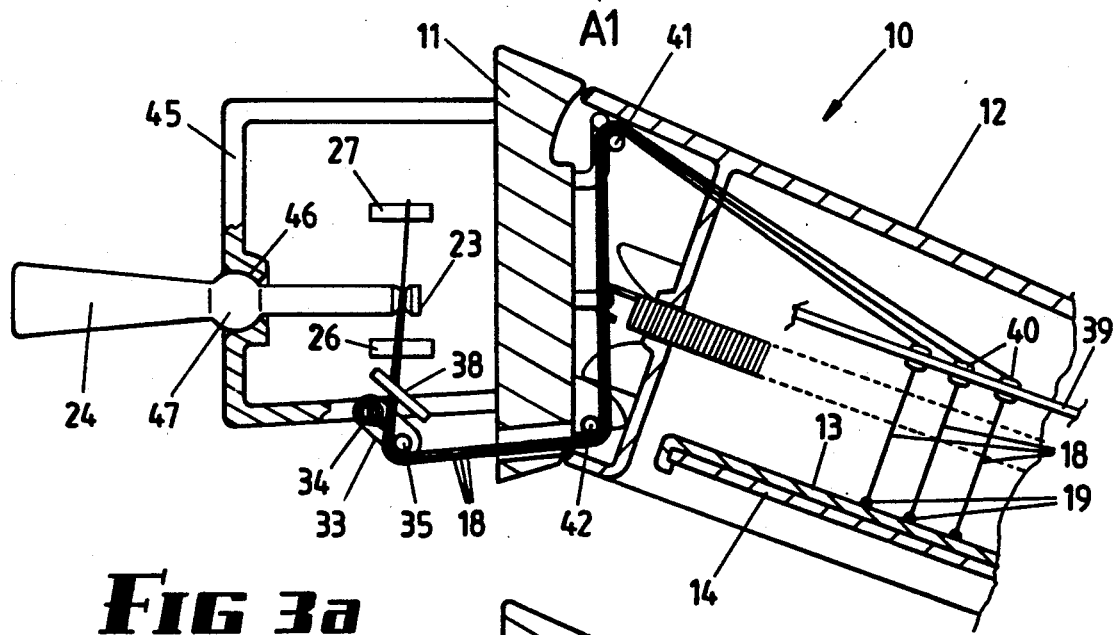
FIG. 3a is a fragmentary section which illustrates an arrangement similar to FIG. 1 in principle but applied to a "break-away" mirror of the two "break-away" axes type illustrating how the invention is applied to extend unsheathed lines through the two zones adjacent each of the "break-away" axes.
Figure 3C:
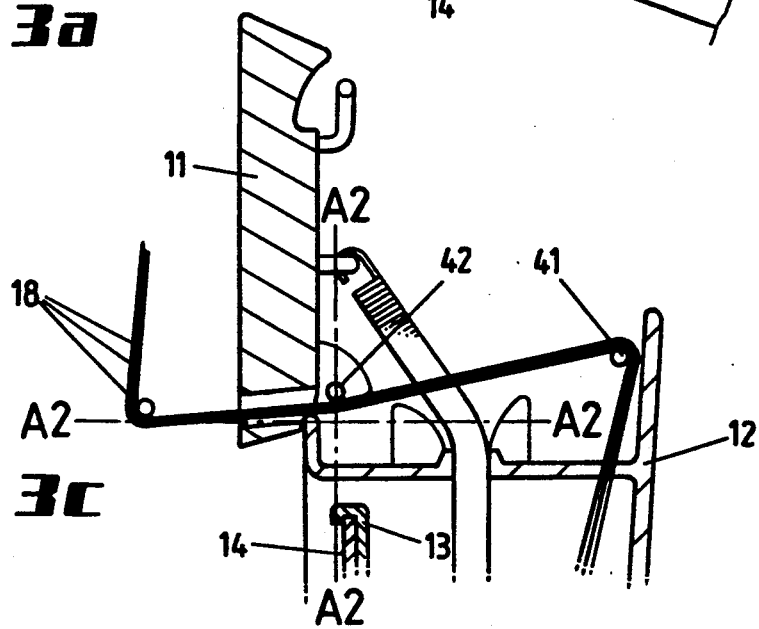
FIG. 3c illustrates how the lines are deflected by curved guideline surfaces upon rearward "break-away"
Figure 4B:
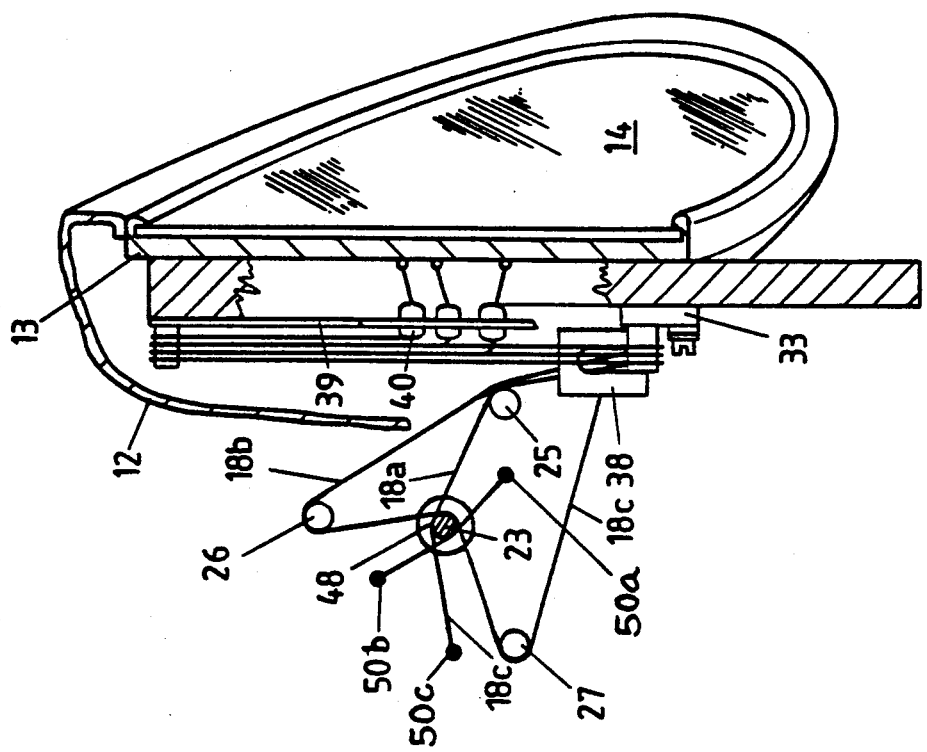
FIG. 4b shows a further development wherein the lever inner end itself carries a rigid curved guideline surface and the lines extend around that surface and are anchored to a fixed structure (which can be the control lever retention means)
Figure 4A:
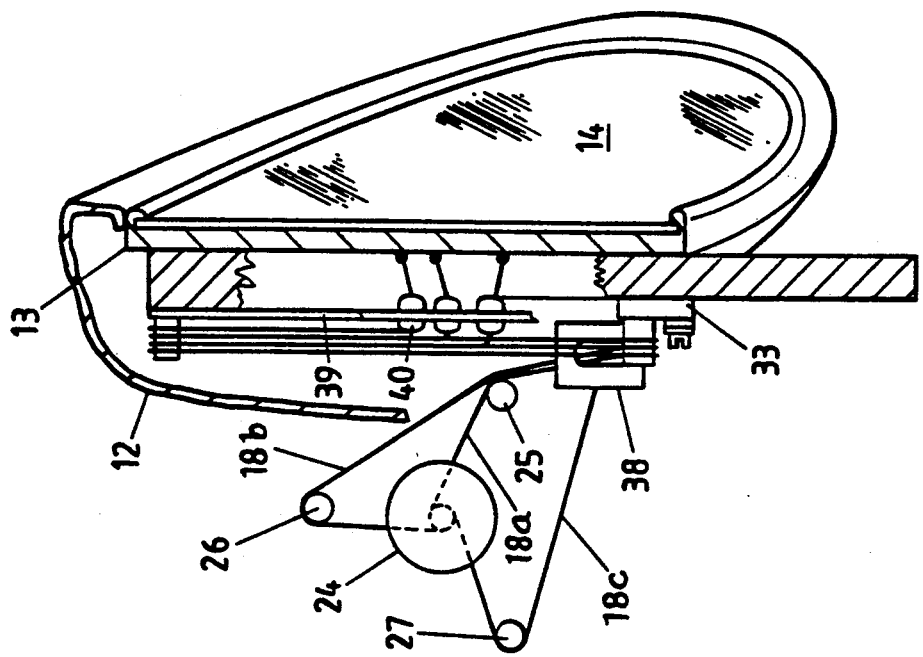
FIG. 4a is a partly sectioned end view of FIG. 3a showing the way in which lines attached to the inner end of the control lever extend around rigid curved guideline surfaces positioned around the lever inner end, the lines being attached to the lever inner end.

In the arrangement of FIGS. 3 and 4, the spring tensioner comprises a small pivoted arm 33 which is tensioned by means of a torsion spring 34, (FIG. 3a) and carries on it a pin 35 the surface of which constitutes the curved line guide surface for the lines 18. The same arrangement of the guides 25, 26 and 27 is used as in FIG. 2. There is also provided a guide plate 38 having an aperture an edge of which guides the lines before they pass over the guideline surfaces 25, 26 and 27. Between the mirror back 13 and the mirror case 12 there is located a reaction member 39 which contains guide ferrules 40 for guiding the lines 18 towards the anchors 19 on the mirror back 13. As illustrated in FIGS. 3b and 3c, "break-away" takes place around the two axes A1—A1 (FIG. 3b) and A2—A2 (FIG. 3c), and in order to reduce change of tension in the lines 18, the guides 41 and 42 are in respective "break-away" zones close to the axes A1—A1 and A2—A2. The guide 41 is carried on the mirror casing 12 and guide 42 is carried on the mounting frame 11.

As best seen in FIG. 3a, the lever arm is supported from the mounting frame 11 by means of a frame 45 which contains a part-spherical socket 46, the socket 46 accommodating a part-spherical protuberance 47 intermediate the ends of the control lever 24, but in most applications the frame 45 will be of shape to suit the available space within which the lever inner end 23 must move.

Although the arrangement of FIGS. 3a, 3b, 3c and 4a is usually adequate for providing the required movement of the mirror back 13, in some instances advantage is achieved by having a further guide surface 48 (FIG. 4b) on the inner end of the lever arm 24. The ends of lines 18 are anchored at the anchor points 50a, 50b, and 50c which are fast with the control lever retention means, which as illustrated are fixed to the mounting frame 11, although it may be at other localities. With the arrangement of FIG. 4b, the movement of the inner end 23 of lever 24 is doubled by the "pulley effect" of the guide surface 48.

The second embodiment which is illustrated in FIGS. 5 and 6 employs similar principles, and similar components bear similar designation numerals. However, instead of the lines 18 being unsheathed, FIGS. 5 and 6 illustrate an application wherein Bowden cables 54 are used, the lines 55 being the cores of the Bowden cables. The Bowden cables however need not necessarily have wire cores but the cores can be of non-metalic material, for example long chain polyethylene. Similarly the Bowden cable sheaths 56 can comprise plastic tubing.

The control lever retention means 58 can comprise a sleeve 59 having a central upstanding spigot 60 over which slides a lever carrier 61, the carrier 61 having a part-spherical convex upper surface which engages a complementary part-spherical concave surface 62 of a part-spherical protuberance 63 of control lever 64, the lever carrier 61 being urged outwardly by a tensioning spring 65 which tensions the Bowden cable cores 55 and applies compressive forces to the sheaths 56. The sleeve 59 contains a circular aperture 68 the surface of which constrains movement of the spherical protuberance 63, but the aperture surface 68 contains three recesses 69 which accommodate respective outstanding projections 70, the projections 70 diminishing in cross-sectional area towards the protuberance 63 to provide rigid curved line guide surfaces 71 which lie in planes perpendicular to relevant pivotal axes of the control lever 64, and these surfaces 71 guide the line 55 which then returns down to a single anchor block 72 which is housed in the base of the retention means 58. This facilitates handling of the lines when being assembled. As in the case of FIG. 4b, the movement of the lever 64 is doubled in the lines 55 by the "pulley effect" of the guide surfaces 71 along projections 70.

What is claimed is:

1. Tilt control means for an exterior "break-away" mirror assembly of a motor vehicle, having a mounting frame of shape to be secured to an exterior portion of the motor vehicle body, a mirror casing, a mirror back carrying a mirror and coupled to the casing by a tilt joint for tilting about at least a horizontal axis, and hinge means so operatively coupling the mirror casing to the mounting frames as to provide means for the mirror casing "break-away" about at least one generally vertical axis, comprising:

control lever retention means having a surface defining a concave part-spherical socket, a control lever having a convex part-spherical protuberance intermediate its ends engaging in said socket and constrained by the concave socket walls for universal pivotal movement, rigid curved line guide surface means located radially outwardly from and uniformly spaced around said control lever, a corresponding number of retention anchors on the mirror back spaced radially from said tilt joint, and a corresponding number of flexible lines each extending from a respective retention anchor, around said line guide surface means to a said control lever end, the paths of said lines between said line guide surface means and said control lever end being substantially in a common plane containing said control lever end, and further rigid curved line guide surfaces which guide said lines between the mounting frame and the mirror back to extend through a zone adjacent said "break-away" axis.

2. Tilt control means according to claim 1 wherein said flexible lines are unsheathed.

3. Tilt control means according to claim 1 wherein said flexible line is secured to said control lever end.

4. Tilt control means according to claim 3 wherein said mounting frame comprises said control lever retention means.

5. Tilt control means according to claim 3 further comprising spring loaded tensioning means engaging at least one of said lines between its ends to thereby retain some tension in all said lines.

6. Tilt control means according to claim 1 wherein said hinge means comprises interengaging co-axial hollow spigots on the mirror casing and mounting frame, and said flexible lines extend through the hollow spigots.

7. Tilt control means according to claim 1 wherein there are two said hinge means, one near a forward edge of said casing and the other near a rear edge of said casing, said rigid curved line guide surfaces including a surface carried by the mounting frame near one of said hinge means and a surface carried by the casing near another of said hinge means.

8. Tilt control means according to claim 1 wherein a still further rigid curved line guide surface is formed on said control lever end, and an unsheathed portion of each control line extends around said still further guide line surface and is secured to said control lever retention means.

9. Tilt control means according to claim 8 wherein said mounting frame comprises said control lever retention means.

10. Tilt control means according to claim 8 further comprising spring loaded tensioning means engaging at least one of said lines between its ends to thereby retain some tension in all said lines.

* * * * *

UNITED STATES PATENT AND TRADEMARK OFFICE
CERTIFICATE OF CORRECTION

PATENT NO. : 5,205,182

DATED : April 27, 1993

INVENTOR(S) : Robert W. Gilbert

It is certified that error appears in the above-identified patent and that said Letters Patent is hereby corrected as shown below:

Column 1, line 4, "The" should be --This--.

Column 2, line 34, "in" should be --on--.

Column 3, line 24, "Which" should be --which--.

Column 6, line 23, claim 3, "said flexible" should be --control line--.

Column 6, line 49, claim 9, "8" should be --3--.

Column 6, line 52, claim 10, "8" should be --3--.

Signed and Sealed this

First Day of March, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,205,182
DATED : April 27, 1993
INVENTOR(S) : Robert W. Gilbert

It is certified that error appears in the above-identified patent and that said Letters Patent is hereby corrected as shown below:

Column 1, line 4, "The" should be --This--.

Column 2, line 34, "in" should be --on--.

Column 3, line 24, Which" should be --which--.

Column 6, line 23, claim 3, "said flexible" should be --each control--.

This certificate supersedes Certificate of Correction issued March 1, 1994.

Signed and Sealed this

Twenty-eighth Day of June, 1994

Attest:

BRUCE LEHMAN

*Attesting Officer*  *Commissioner of Patents and Trademarks*